310-334 SR
XR 3,318,578 213
X 84314
4

May 9, 1967 N. G. BRANSON 3,318,578

CLEANING APPARATUS

Filed March 22, 1965 ultrasonic

INVENTOR.
NORMAN G. BRANSON
BY
Ervin B. Steinberg

3318578
OR IN 259/1R

United States Patent Office 3,318,578

Patented May 9, 1967

3,318,578

CLEANING APPARATUS

Norman G. Branson, Stamford, Conn., assignor, by mesne assignments, to Branson Instruments, Inc., Stamford, Conn., a corporation of Delaware Filed Mar. 22, 1965, Ser. No. 441,609

17 Claims. (Cl. 259—1)

This invention refers generally to a cleaning apparatus and more particularly has reference to a sonic or ultrasonic cleaning apparatus which makes use of a cavitated cleaning solution.

Most sonic cleaning apparatus comprises basically an electrical generator and a tank. The generator receives alternating current energy at line voltage and at line frequency and converts this energy to high frequency electrical power. The tank, a steel trough or container for holding a cleaning solution, is provided with one or more magnetostrictive or electrostrictive transducers which, energized from the generator, convert electrical energy to mechanical vibrations. The high frequency, high energy vibrations produced by the transducers cause cavitation of the cleaning solution and this activity greatly accelerates and aids the removal of contamination from articles immersed in the solution. A high frequency cable interconnects the generator with the transducers of the tank.

The high frequency generator or power converter, that is, the unit which converts the power from low frequency line voltages to high frequency, typically 20,000 cycles per second or higher at several hundred volts, conventionally comprises a rectifier circuit and an inverter or pulsing circuit and generally is housed in a special enclosure which includes forced air cooling in order to maintain the operation of the electrical circuit components within safe temperature limits. It is apparent that the enclosure which houses the electronic circuit components, the cooling means, the electrical connections for power input from the power line and power output to the transducers contribute to the cost and bulkiness of the entire apparatus.

Recent advances in the art of electrical components, particularly transistors, have made it possible to miniaturize the electrical circuit so as to make it less bulky. Moreover, transistors and other components have been devised which can operate at elevated temperatures and, thus, while the requirement for cooling has not been eliminated, it has been reduced.

I have, therefore, directed my attention to a new and improved cleaning apparatus which is greatly simplified in its construction, in its requirement for space, its cost and, last but not least, in the quantity of components. To this end, the novel cleaning apparatus according to this invention comprises essentially a sealed submersible enclosure which contains not only one or more of the transducers necessary for cavitating the cleaning solution, but also the electrical circuit which accepts electrical energy at power line voltage and frequency and converts this energy to the frequency and voltage necessary for driving the transducers. Thus, the electrical circuit and the transducers are enclosed within a single enclosure which is immersible in the cleaning solution whereby the transducers cavitate the cleaning solution and the cleaning solution by virtue of its contact with the enclosure acts as the heat sink or cooling medium for the power dissipating electrical circuit elements of the power conversion circuit. This construction, as will be apparent, greatly simplifies the arrangement of an ultrasonic cleaning apparatus, eliminates long high frequency power leads between the conversion unit and the transducers and omits many of the components contributing to the cost of the entire apparatus, particularly the extra cabinet, the cooling fan, hardware, connectors and the like.

One of the principal objects of this invention is, therefore, the provision of a new and improved sonic cleaning apparatus which eliminates one or more of the disadvantages and limitations of prior art devices.

Another object of this invention is the provision of a sonic cleaning apparatus which provides for the use of an immersible, liquid tight enclosure which contains both the transducers for cavitating the cleaning solution and the electronic power conversion unit which converts low frequency line power to high frequency power for operating the transducer units.

A further object of this invention is the provision of a new and improved ultrasonic cleaning apparatus, making use of a single ~~submersible~~ enclosure which houses the electromechanical transducers for cavitating the liquid and which contains all of the electronic power conversion elements, whereby the cleaning solution surrounding the enclosure acts as a cooling medium for the electronic components within this enclosure.

A further and still other object of this invention is the provision of a greatly simplified ultrasonic cleaning installation which comprises essentially a cleaning tank and a submersible enclosure which can be connected directly to power line voltage and frequency.

Further and still other objects of this invention will be more clearly apparent by reference to the following description when taken in conjunction with the accompanying drawings in which.

Figures 1, 2, 3:
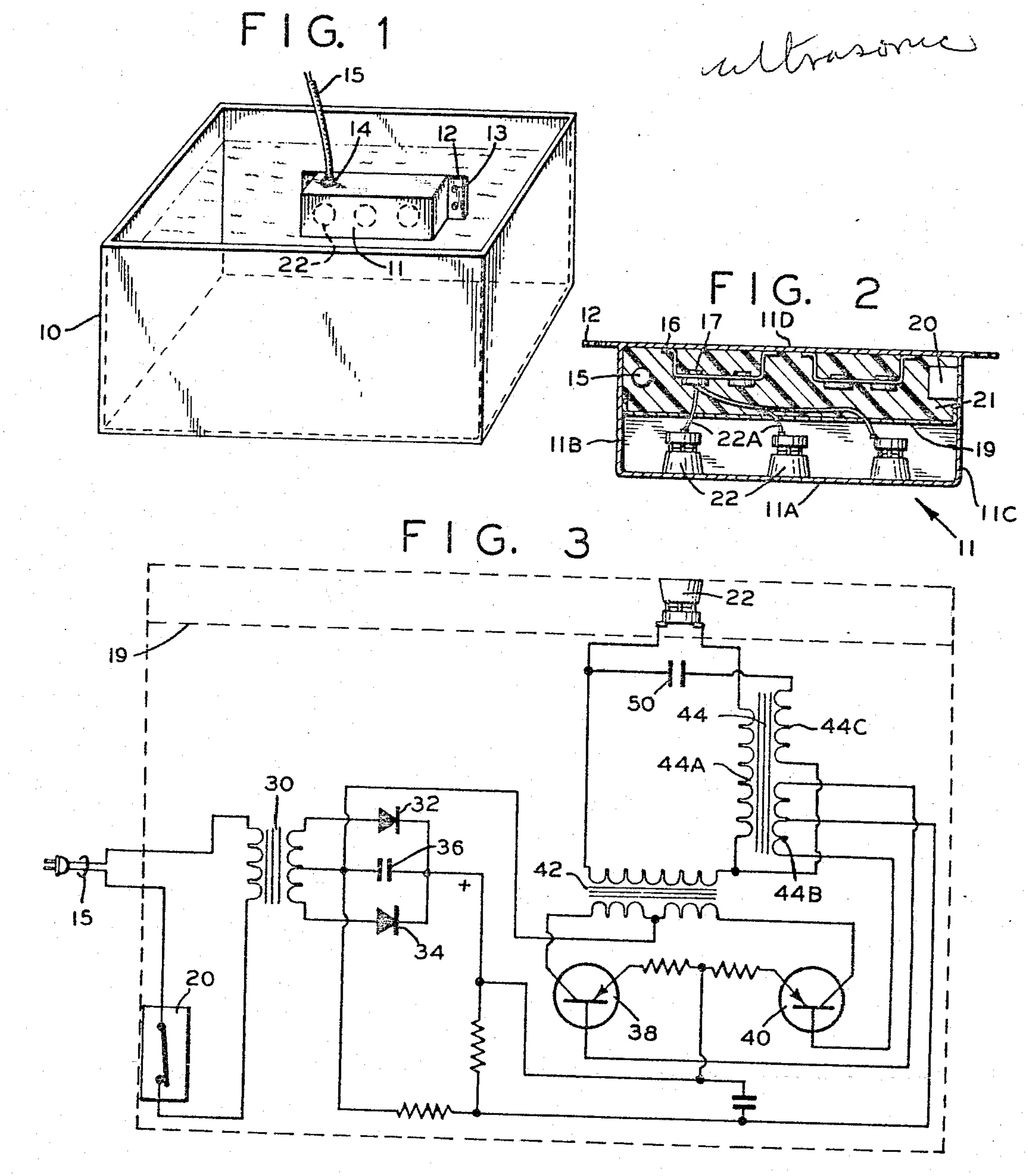
FIGURE 1 is a perspective view of a typical embodiment of the present invention.
FIGURE 2 is a sectional view of a typical construction of the submersible enclosure which contains the electromechanical transducer units and the electrical circuit associated therewith.
FIGURE 3 is a schematic diagram of a typical electrical circuit which may be used for power conversion.

Referring now to the figures and FIGURE 1 in particular, there is shown a tank 10 which is adapted to be filled with a cleaning solution. A liquid tight submersible enclosure 11 is mounted to the rear wall of the tank by means of mounting flanges 12 and conventional securing means 13. The enclosure 11 contains a plurality of transducers for cavitating the liquid disposed in the tank 10 and houses the electrical power conversion circuit which receives its input power from a power line via a line cord 15, feeding through a liquid tight electrical connector 14.

As seen best in FIGURE 2, the enclosure 11, made of stainless steel or other suitable material, comprises a front wall 11A, a rear wall 11D and two side walls 11B and 11C. A plurality of electromechanical transducers 22 are mounted to the inner surface of the front wall 11A of the enclosure. The transducers as illustrated here are of the electrostrictive kind as described in U.S. Patent No. 3,066,232, issued to Norman G. Branson on Nov. 27, 1962, entitled, "Ultrasonic Transducer." It will be apparent that other types of transducers, for instance magnetostrictive transducers, may be employed without deviating from the principle of the invention. The front face of the transducers is bonded to the inner surface of the front wall 11A by epoxy resin. A dividing plate 19 compartmentizes the enclosure 11 and separates the front transducer compartment from the rear compartment which contains the electrical power conversion circuit. The electrical components of the conversion circuit are mounted typically on one or more vertically arranged electrical circuit boards 17, each supported from the rear wall 11D by stand-off brackets 16. There is provided also a thermostatic control device 20 which serves to interrupt the electrical circuit when the enclosure temperature exceeds a predetermined value. Numeral 21 identifies a potting compound of sufficiently high thermal conductivity to transfer the heat produced by the heat dissipating electrical circuit elements of the conversion circuit to the walls of the enclosure 11. Aside from a potting compound, epoxy resins, or commercially available silicone liquids or oils, or similar solid or liquid materials may be used to fill the space between the dividing wall 19 and the rear wall 11D. Alternatively, a gaseous heat transfer medium, such as hydrogen or Freon, may be used for providing adequate heat transfer between the electrical circuit and the enclosure 11.

A typical electrical power conversion circuit disposed on the circuit cards 17 and using a pair of transistors is shown in FIGURE 3. It should be understood, however, that any other conversion circuit may be used which converts 60 cycle, or other line frequency, electrical energy to high frequency energy suitable for operating the transducers. While there exists cleaning apparatus in the audible frequency range, most units, for the convenience of the personnel, operate above the audible frequency range and, thus, utilize a frequency of twenty thousand cycles per second or higher. The voltage fed to the electrostrictive transducers is several hundred volts.

The circuit per FIGURE 3 is a commercially used common emitter direct current-to-alternating current converter. It receives its low voltage, low frequency input from an A.-C. power line via conductor 15 and a thermostatic control device 20. This input power is applied to a full wave rectifier circuit which comprises a transformer 30, two rectifiers 32 and 34 and a filter capacitor 36. Two transistors 38 and 40 are connected with their collector electrodes for push-pull operation to the primary winding of a power transformer 42, the center tap of the primary winding being connected to the negative side of the D.-C. power. The emitter electrodes of the transistors are connected to one another and coupled to the positive side of the D.-C. power supply.

The output winding of transformer 42 is connected in series with winding 44A of a feedback transformer 44 and provides high frequency power to one or more electromechanical transducers 22. The winding 44B of the transducer serves as a feedback winding and is coupled to the base electrodes of the transistors 38 and 40. The center tap of this winding is connected to the base bias voltage for the transistors 38 and 40. The capacitor 50 together with the feedback winding 44C serves as compensation for the change in reactance as the mechanical loading of the transducer 22 varies.

Figure 4:
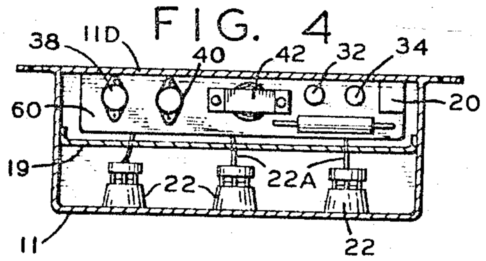
FIGURE 4 is a sectional view of the submersible enclosure, similar to FIGURE 2, showing an alternative construction.

A further alternative construction of the enclosure 11 is shown in FIGURE 4 wherein a metallic plate 60, which is in heat conductive relationship with the enclosure, as by welding, extends from the rear wall 11D. This plate supports substantially all of the heat dissipating electrical circuit elements, such as the transistors 38 and 40, the power transformer 42, the rectifiers 32 and 34, and any other components of this type. The thermostatic control device 20 senses the temperature of the plate 60. In this embodiment, the heat dissipated by the various circuit elements is transferred directly to the metallic plate 60 and from there to the enclosure 11. Depending upon the particular cooling requirements of the circuit elements, the thickness of the plate 60 and the degree of its conductive contact with the enclosure, additional heat transfer means, e.g. a solid or fluid medium, may be omitted.

The thermostatic control device 20, instead of sensing the temperature of the enclosure 11 or the temperature of the plate 60, may be positioned adjacent a critical electrical component or components similar to embedding heat sensing elements within the windings of large electrical motors. Alternatively, the thermostatic control device may be immersed in the surrounding cleaning solution in order to sense the temperature of the solution and to interrupt the electrical circuit when the cleaning solution due to its temperature rise no longer can act as a cooling medium for the electrical circuit.

Operation of the instant arrangement may be visualized as follows:

Low frequency line power is fed via the conductor cable 15 to the power conversion circuit confined within the enclosure 11. The circuit, such as the one shown in FIGURE 3 or any other circuit which may be substituted, converts the low frequency energy to high frequency electrical energy. This energy is transferred via the very short electrical conductors 22A to the transducers 22 to provide vibratory energy to the front enclosure wall 11A. The vibratory energy applied to the enclosure wall cavitates the cleaning solution disposed in the tank and which surrounds the enclosure 11. Simultaneously, the cleaning solution due to its contact with the enclosure 11 acts as a heat sink for the electrical circuitry and dissipates the heat transferred to the walls of the enclosure 11. Thus, the cleaning solution serves not only for cleaning the parts immersed in the tank but acts also as a cooling medium for the electrical conversion circuit. No extraneous cooling means need to be provided.

It will be apparent that this arrangement is characterized by utmost simplicity, convenience and economy. Many of the problems inherent in presently used devices are alleviated and the electrical circuit losses between the conversion unit and the transducers are minimized, if not substantially eliminated as the result of the close proximity of the electrical circuit to the transducers. Thus, the construction and arrangement described heretofore evidences a significant improvement in the art.

While there has been described and illustrated a preferred embodiment of the present invention and several modifications thereof, it will be apparent to those skilled in the art that various other changes and further modifications may be made therein without deviating from the broad principle and intent of the present invention which shall be limited only by the scope of the appended claims.

What is claimed is:

1. In a sonic cleaning apparatus the combination of: a sealed, liquid immersible enclosure;

said enclosure containing:

(a) at least one electromechanical transducer coupled to one wall of said enclosure for providing thereto vibratory energy;

(b) an electrical power circuit which includes heat dissipating circuit elements for receiving low frequency line voltage electrical energy and converting it to high frequency energy coupled to said transducer for causing, when energized, said transducer to provide the vibratory energy;

(c) means causing said heat dissipating elements to be in heat transferring relationship with said enclosure;

(d) electrical circuit connecting means disposed on said enclosure for providing low frequency line voltage electrical energy from without said enclosure to said electrical circuit, whereby when the exterior of said enclosure is immersed in a liquid and said circuit is energized, said transducer is adapted to cavitate said liquid and said liquid by its contact with said enclosure acts as a heat sink for said heat dissipating elements.

2. In a sonic cleaning apparatus as set forth in claim 1 wherein said heat dissipating elements include a solid state circuit device.

3. In a sonic cleaning apparatus as set forth in claim 1 wherein said heat dissipating elements include a solid state circuit device mounted in heat conductive relationship with said enclosure.

4. In a sonic cleaning apparatus as set forth in claim 1 wherein said means causing said heat dissipating elements to be in heat transferring relationship with said enclosure is a hardened liquid.

5. In a sonic cleaning apparatus as set forth in claim 1 wherein said means causing said heat dissipating elements to be in heat transferring relationship with said enclosure is a fluid.

6. In a sonic cleaning apparatus as set forth in claim 1 wherein said means causing said heat dissipating elements to be in heat transferring relationship with said enclosure is a gas.

7. In a sonic cleaning apparatus as set forth in claim 1 wherein said means causing said heat dissipating elements to be in heat transferring relationship with said enclosure in a liquid.

8. In a sonic cleaning apparatus as set forth in claim 1 wherein said means causing said heat dissipating elements to be in heat transferring relationship with said enclosure is a metallic support upon which a portion of said elements is mounted, said support being fastened to said enclosure.

9. In a sonic cleaning apparatus as set forth in claim 1 wherein said immersible enclosure is a metal housing and said circuit includes a thermal sensing element to preclude operation of the said circuit when said enclosure reaches a predetermined temperature.

10. In an ultrasonic cleaning apparatus the combination of:

a tank adapted to receive a cleaning solution;

a sealed, liquid immersible enclosure adapted to be immersed in said tank and in contact with the cleaning solution therein;

said enclosure containing:

(a) at least one electromechanical transducer coupled to one wall of said enclosure for providing vibratory energy thereto;

(b) an electrical power circuit which includes heat dissipating circuit elements for receiving low frequency line voltage electrical energy and converting it to high frequency energy of at least five thousand cycles per second coupled to said transducer for causing said transducer to provide vibratory energy to said wall;

(c) means causing said heat dissipating elements to be in heat transferring relationship with said enclosure;

(d) electrical circuit connecting means disposed on said enclosure for providing low frequency line voltage electrical energy from without said enclosure to said circuit within said enclosure;

whereby when said circuit is energized and said tank is filled with the solution, said transducer cavitates the solution and the solution by its contact with said enclosure simultaneously acts as a cooling medium for said heat dissipating elements.

11. In an ultrasonic cleaning apparatus as set forth in claim 10 and including a thermostatic control device for sensing the temperature of the circuit and coupled for blocking the operation of said circuit when a predetermined temperature is reached.

12. In an ultrasonic cleaning apparatus as set forth in claim 10 and including a thermostatic control device mounted to sense the temperature of said enclosure and coupled to block operation of said circuit when said enclosure reaches a predetermined temperature.

13. In an ultrasonic cleaning apparatus as set forth in claim 10 and including a thermostatic control device for sensing the temperature of the cleaning solution and coupled for blocking the operation of said circuit when the solution reaches a predetermined temperature.

14. In an ultrasonic cleaning apparatus the combination of:

a tank adapted to contain a liquid cleaning solution;

a sealed metallic, liquid immersible, enclosure for immersion in said tank and for contact with the cleaning solution;

said enclosure containing:

(a) a plurality of electromechanical transducing means mounted to one side wall of said enclosure for providing vibratory energy thereto;

(b) an electrical power circuit including heat dissipating power conversion means for receiving low frequency line voltage electrical energy and converting it to energy in the ultrasonic frequency range coupled to said transducing means for causing, when energized, said transducing means to provide the vibratory energy;

(c) means causing said heat dissipating conversion means to be in heat conductive relationship with said enclosure to transfer heat thereto;

(d) liquid tight electrical circuit connecting means disposed on said enclosure for providing low frequency line voltage electrical energy from without said enclosure to said circuit within said enclosure;

whereby when said circuit is energized and said tank is filled with the solution said transducing means cavitate the solution and the solution by its contact with said enclosure cools said heat dissipating conversion means.

15. In a sonic cleaning apparatus the combination of:

a sealed, liquid submersible enclosure having two compartments;

said first compartment having at least one electromechanical transducer coupled to one wall of said enclosure for providing thereto vibratory energy;

said second compartment including an electrical power circuit which includes heat dissipating electrical circuit elements for receiving low frequency line voltage electrical energy and converting it to high frequency energy of at least five thousand cycles per second;

electrically conductive means for coupling said circuit to said transducer for causing, when energized, said transducer to provide the vibratory energy;

heat conductive means disposed in said second compartment for tarnsferring the heat dissipated by said circuit elements to said enclosure;

electrical circuit connecting means disposed on said enclosure for providing low frequency line voltage electrical energy from without said enclosure to said circuit, whereby when the exterior of said enclosure is immersed in a liquid and said circuit is energized, said transducer is adapted to cavitate said liquid and said liquid by its contact with said enclosure acts as a heat sink for said circuit elements.

16. In an ultrasonic cleaning apparatus the combination of:

a tank adapted to contain a cleaning solution;

a sealed metallic, liquid immersible, enclosure for immersion in said tank and for contact with the cleaning solution;

said enclosure having a plurality of compartments;

a first of said compartments having a plurality of electromechanical transducer means mounted to an inside surface of an outer wall of said enclosure for providing vibratory energy thereto;

a second of said compartments having an electrical power circuit which includes heat dissipating electrical circuit elements for receiving low frequency line voltage electrical energy and converting it to energy in the ultrasonic frequency range;

electrically conductive means between said first and said second compartments for coupling said circuit to said transducer means for causing the latter, when energized, to provide the vibratory energy;

heat conductive means disposed in said second compartment for transferring the heat dissipated by said circuit elements to said enclosure;

liquid tight electrical circuit connecting means disposed on said enclosure for providing low frequency line voltage electrical energy from without said enclosure to said circuit within said second compartment;

whereby when said circuit is energized and said tank is filled with the solution, said transducer means cavitate the solution and the solution by its contact with said enclosure cools said heat dissipating circuit elements.

17. An ultrasonic cleaning apparatus as set forth in claim 16 and including a thermostatic control device for sensing the temperature of said circuit and coupled to preclude operation of said circuit when a predetermined temperature is reached.

References Cited by the Examiner

UNITED STATES PATENTS

| | | | |
|---|---|---|---|
| 2,900,038 | 8/1959 | Jacke et al. | 259—1 X |
| 2,938,099 | 5/1960 | Cheli | 310—9 X |
| 2,967,924 | 1/1961 | Friend | 310—8.9 X |
| 3,071,736 | 1/1963 | Vonbun et al. | 310—8.9 X |
| 3,180,626 | 4/1965 | Mettler | 259—1 X |
| 3,252,109 | 5/1966 | White | 310—8.9 X |

WALTER A. SCHEEL, *Primary Examiner.*

IRVING BUNEVICH, *Examiner.*

J. M. BELL, *Assistant Examiner.*